Patented Aug. 20, 1940

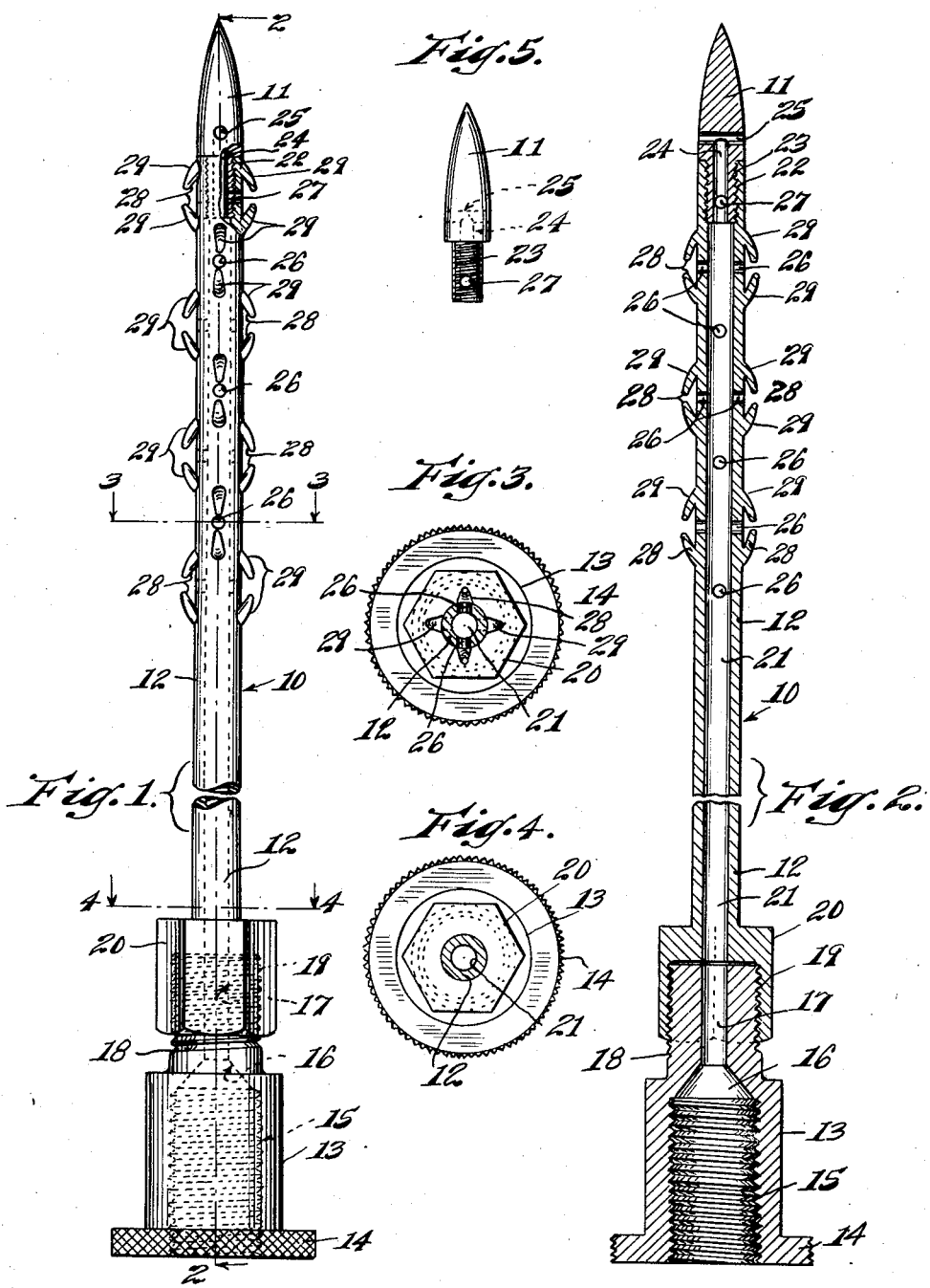

2,212,477

UNITED STATES PATENT OFFICE 2,212,477

INJECTION NEEDLE

Herman J. Mayer, Chicago, Ill.

Application June 19, 1939, Serial No. 279,815

8 Claims. (Cl. 99—256)

This invention relates to improvements in needles for injecting curing composition into meats, etc.

An object of my invention, among others, is the provision of improvements in injection needles whereby the usual holes provided in said needles for supplying curing composition will not become clogged by having the tissue close the holes.

Another object of my invention is to provide an improved injection needle whereby the curing composition will be injected steadily and thoroughly as desired so that the meat may be thoroughly cured throughout.

Still another object of my invention has been to provide a needle of the kind described which will not only be effective for the purpose stated, but which will be relatively inexpensive and durable.

Other objects and advantages will become apparent and be brought out more fully in the following specification, reference being had to the accompanying drawing wherein:

Fig. 1 is an enlarged view of a meat curing needle;

Fig. 2 is a diametrical longitudinal or vertical section taken on the line 2—2 of Fig. 1;

Fig. 3 is a transverse section on the line 3—3 of Fig. 1;

Fig. 4 is a transverse section on the line 4—4 of Fig. 1;

Fig. 5 is a detailed view of the point of the needle.

Referring more particularly to the drawing showing the form which I have selected for the purpose of illustrating the principle of my invention, there is shown an injection needle 10 consisting, in the form shown, of a circular tapered point 11, a shank 12 and a coupling connection 13. The coupling connection 13 may have a knurled flange 14 and a threaded bore 15 adapted to receive the threaded end of a supply pipe. The bore 15 is tapered as at 16 to a reduced smooth bore 17 and in a reduced and externally threaded neck 18 and is adapted to extend through a threaded bore 19 in a hexagonally formed head 20 which may be formed integrally with the shank 12. Adapted to register with the reduced bore 17 is a bore 21 in the shank 12, the bore 21 extending the length of the shank. The upper end of the bore 21 is internally threaded to receive a preferably reduced and externally threaded extension 23 on the point 11.

The point 11 has a bore 24, which may be reduced, registering with the bore 21 and terminates at a transverse bore 25 extending diametrically through the needle point body.

The shank 12 has a plurality of radial openings 26 of aligned spaced series which may be disposed normal to each other or otherwise and which may be arranged in staggered relation about the shank. The openings 26 are adapted to communicate with the central bore 21. It will be seen that in the form shown the opening 27 extends not only through the shank 12, but also through the extension 23 and bore 24.

Acording to the principle of my invention, the shank 12 is provided with pluralities of pairs of tapered guarding lugs 28, there being provided in the form shown a pair of these lugs 28 extending toward each other but spaced apart at their inner ends as shown, over the holes. The guarding lugs may be curved on the outer side as shown at 29. The lugs may be cast integrally or welded.

The operation of the needle will be manifest to those skilled in the art. When the needle is injected into the meat to be cured the guarding lugs will fend away the tissue and space it from the openings and prevent the meat from clogging the openings. As a result there will be no impediment to the flow of the curing compound which will flow freely as intended and be injected thoroughly through the tissue.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In means for injecting curing composition into matter to be cured, a needle provided with a central bore, openings in the needle communicating with said central bore, guarding means for said openings, said means including a pair of lugs arranged adjacent one or more of said openings.

2. In means for injecting curing composition into matter to be cured, a needle provided with a central bore, openings in the needle communicating with said central bore, guarding means for said openings, said means including a pair of lugs extending toward each other and arranged adjacent one or more of said openings.

3. In means for injecting curing composition into matter to be cured, a needle provided with a central bore, openings in the needle communicating with said central bore, guarding means for said openings, said means including a pair of curved lugs extending toward each other and arranged adjacent one or more of said openings.

4. An injection needle for curing meats and the like, including a tubular needle body having a series of longitudinally spaced staggered openings through its wall, a point for the needle having an opening communicating with the interior of the tubular body and guard lugs externally on the body and extending toward each other over each hole with their inner ends spaced apart.

5. An injection needle for curing meats and the like, including a tubular needle body having a series of longitudinally spaced staggered openings through its wall, a point for the needle having an opening communicating with the interior of the tubular body and guard lugs externally on the body and extending toward each other over each hole with their inner ends spaced apart, said lugs tapered toward their free ends, said point having a shank coupled to the body and one of the holes extending through the body at the shank, and a coupling at the opposite end of the body.

6. An injection needle for curing meats and the like, including a tubular needle body having a series of holes through its wall spaced apart lengthwise thereof, a point for the needle having an opening communicating with the interior of the tubular body and longitudinal guard lugs externally on the body and extending toward each other adjacent certain holes with their inner ends spaced apart at the holes.

7. An injection needle for curing meats and the like, comprising a tubular needle body having a series of longitudinally spaced holes through its wall, a point for the needle having an opening communicating with the interior of the tubular body and a pair of outwardly extending guard lugs adjacent certain of said holes lengthwise of the body, said lugs being curved toward each other with their free ends spaced from the body and each other.

8. An injection needle for curing meats and the like, including a tubular needle body having a series of opposed longitudinally spaced holes through its wall, a point for the needle having openings communicating with the interior of the tubular body and a pair of outwardly extending guard lugs externally on the body for each hole and extending lengthwise of the body toward each other with their free ends spaced apart and from the body adjacent each hole.

HERMAN J. MAYER.